US012665685B2

(12) United States Patent
Vanam et al.

(10) Patent No.: US 12,665,685 B2
(45) Date of Patent: Jun. 23, 2026

(54) EARLY IDENTIFICATION OF OPTICAL TRANSCEIVER FAILURES

(71) Applicant: Selector Software, Inc., Santa Clara, CA (US)

(72) Inventors: Aditya Vanam, Bangalore (IN); Javier Antich Romaguera, Valencia (ES); Debashis Mohanty, San Jose, CA (US)

(73) Assignee: Selector Software, Inc., Santa Clara, CA (US)

( * ) Notice: Subject to any disclaimer, the term of this patent is extended or adjusted under 35 U.S.C. 154(b) by 185 days.

(21) Appl. No.: 18/533,114

(22) Filed: Dec. 7, 2023

(65) Prior Publication Data

US 2024/0380498 A1 Nov. 14, 2024

Related U.S. Application Data

(60) Provisional application No. 63/501,294, filed on May 10, 2023.

(51) Int. Cl.
  *H04B 17/17* (2015.01)
  *H04B 17/373* (2015.01)
(52) U.S. Cl.
  CPC ........... *H04B 17/17* (2015.01); *H04B 17/373* (2015.01)
(58) Field of Classification Search
  CPC ... H04B 17/15–17; H04B 10/40; H04L 41/06; H04W 24/04–08
  See application file for complete search history.

(56) References Cited

U.S. PATENT DOCUMENTS 7,006,947 B2 * 2/2006 Tryon, III ............... H04L 41/06
                                                    703/2
7,477,847 B2 * 1/2009 Hofmeister ............ H04B 10/40
                                                    398/128
(Continued)

FOREIGN PATENT DOCUMENTS

CA 3220661 A1 * 12/2022 ....... B60K 15/03006
CN 108923846 A * 11/2018 ............. H04B 10/03
(Continued)

OTHER PUBLICATIONS

D. Wang et al., "Optical Performance Monitoring of Multiple Parameters in Future Optical Networks," in Journal of Lightwave Technology, vol. 39, No. 12, pp. 3792-3800, 15 Jun. 15, 2021 (Year: 2021).*

(Continued)

*Primary Examiner* — Berhanu Tadese
(74) *Attorney, Agent, or Firm* — Kowert, Hood, Munyon, Rankin & Goetzel, P.C.; Rory D. Rankin

(57) ABSTRACT

Systems, apparatuses, and methods are disclosed to identify sustained and significant changes in transceiver metrics for predicting transceiver failure. A percentage of change with respect to a previous value in the metric can be tracked over a configurable period of time. Anomalies can be identified if such change persists over a minimum configurable period of time. The metrics as well as transceiver metadata are correlated to perform an outlier detection. Optical transceivers of the same type (characterized by a combination of vendor, type, and model) are analyzed for outlier detection. A variability factor is taken into account for metrics, as an indicator of a likely hardware condition that may be precursor of a failure.

20 Claims, 6 Drawing Sheets

(56) References Cited

U.S. PATENT DOCUMENTS

| | | | | |
|---|---|---|---|---|
| 7,986,632 B2 * | 7/2011 | Monaco | | H04L 43/022 |
| | | | | 370/231 |
| 8,526,821 B2 * | 9/2013 | Noble | | H04B 10/0773 |
| | | | | 398/16 |
| 8,582,978 B2 * | 11/2013 | Ekkizogloy | | H04B 10/40 |
| | | | | 398/136 |
| 8,693,865 B2 * | 4/2014 | Aguren | | H04B 10/079 |
| | | | | 398/28 |
| 9,204,329 B2 * | 12/2015 | Boyle | | H04W 48/00 |
| 9,319,143 B2 * | 4/2016 | El-Ahmadi | | H04B 10/25133 |
| 9,380,475 B2 * | 6/2016 | Wolcott | | H04W 24/08 |
| 9,435,711 B2 * | 9/2016 | Wu | | G01M 11/3109 |
| 9,608,880 B1 * | 3/2017 | Goodall | | H04L 43/045 |
| 9,819,416 B2 * | 11/2017 | Elahmadi | | H04L 1/0042 |
| 9,882,633 B2 * | 1/2018 | Schmidt | | H04J 14/0295 |
| 9,882,634 B1 * | 1/2018 | Al Sayeed | | H04B 10/40 |
| 10,396,897 B1 * | 8/2019 | Malave | | H04B 10/07955 |
| 10,806,933 B2 * | 10/2020 | Virtanen | | A61B 5/0816 |
| 11,703,186 B2 * | 7/2023 | McNicholas | | F17C 13/02 |
| | | | | 180/271 |
| 11,805,143 B2 * | 10/2023 | Balabine | | H04L 63/1458 |
| 12,141,731 B2 * | 11/2024 | Jayathirtha | | G06Q 10/0635 |
| 12,323,812 B2 * | 6/2025 | Montalvo | | G06F 30/27 |
| 12,471,996 B2 * | 11/2025 | Braido | | G16H 30/40 |
| 2006/0009951 A1 * | 1/2006 | Tryon, III | | G06F 11/008 |
| | | | | 702/185 |
| 2007/0192065 A1 * | 8/2007 | Riggs | | H04L 41/06 |
| | | | | 702/189 |
| 2008/0159737 A1 * | 7/2008 | Noble | | H04B 10/0773 |
| | | | | 398/16 |
| 2009/0182531 A1 * | 7/2009 | Ekkizogloy | | H04B 10/40 |
| | | | | 702/182 |
| 2009/0257744 A1 * | 10/2009 | Yamamoto | | H04J 3/14 |
| | | | | 398/22 |
| 2011/0170858 A1 * | 7/2011 | Aguren | | H04B 10/079 |
| | | | | 398/20 |
| 2013/0107265 A1 * | 5/2013 | Wu | | H04B 10/071 |
| | | | | 356/445 |
| 2013/0258865 A1 * | 10/2013 | Kovvali | | H04W 24/10 |
| | | | | 370/241 |
| 2014/0254392 A1 * | 9/2014 | Wolcott | | H04W 24/08 |
| | | | | 370/242 |
| 2015/0125158 A1 * | 5/2015 | El-Ahmadi | | H04L 1/0041 |
| | | | | 398/135 |
| 2016/0080965 A1 * | 3/2016 | Boyle | | H04W 24/10 |
| | | | | 370/252 |
| 2016/0205009 A1 * | 7/2016 | Pasini | | H04L 43/103 |
| | | | | 709/224 |
| 2016/0301584 A1 * | 10/2016 | Gehl | | H04L 43/0876 |
| 2017/0054507 A1 * | 2/2017 | Elahmadi | | H04J 3/1652 |
| 2017/0093484 A1 * | 3/2017 | Schmidt | | H04J 14/0295 |
| 2018/0138970 A1 * | 5/2018 | Schmidt | | H04B 10/40 |
| 2018/0196837 A1 * | 7/2018 | Anand | | G06F 11/3409 |
| 2018/0268238 A1 * | 9/2018 | Khan | | G06V 10/751 |
| 2019/0070419 A1 * | 3/2019 | Virtanen | | A61B 5/7217 |
| 2019/0138423 A1 | 5/2019 | Agerstam et al. | | |
| 2019/0280942 A1 * | 9/2019 | Côté | | H04L 41/147 |
| 2020/0153690 A1 * | 5/2020 | Basu | | H04L 63/10 |
| 2021/0152455 A1 * | 5/2021 | Castle | | H04L 43/0876 |
| 2021/0303381 A1 * | 9/2021 | Baldassarre | | G06N 5/04 |
| 2022/0245013 A1 * | 8/2022 | Ciabarra, Jr. | | G06F 11/079 |
| 2022/0255622 A1 | 8/2022 | Amari | | |
| 2022/0282835 A1 * | 9/2022 | McNicholas | | B60K 15/04 |
| 2022/0321699 A1 * | 10/2022 | Willshire | | H04M 3/5183 |
| 2022/0398665 A1 * | 12/2022 | Jayathirtha | | G06Q 40/06 |
| 2023/0059298 A1 * | 2/2023 | Beerman | | G01N 29/036 |
| 2023/0064590 A1 * | 3/2023 | McNicholas | | B60K 15/07 |
| 2023/0157757 A1 * | 5/2023 | Braido | | G16H 20/40 |
| | | | | 345/419 |
| 2023/0157762 A1 * | 5/2023 | Braido | | A61B 34/37 |
| | | | | 600/424 |
| 2023/0196242 A1 * | 6/2023 | Kumar | | G06F 16/9024 |
| | | | | 705/7.27 |
| 2023/0237404 A1 * | 7/2023 | Jayathirtha | | G06Q 10/0635 |
| | | | | 705/7.28 |
| 2023/0239073 A1 * | 7/2023 | Bharadwaj | | H04B 17/354 |
| 2023/0266733 A1 * | 8/2023 | Chillar | | G06Q 10/06375 |
| | | | | 700/87 |
| 2023/0396510 A1 * | 12/2023 | Prabhu | | H04B 10/40 |
| 2024/0311736 A1 * | 9/2024 | Sriram | | G06Q 10/06393 |
| 2024/0380498 A1 * | 11/2024 | Vanam | | H04B 10/0793 |
| 2025/0061034 A1 * | 2/2025 | Kumar | | G06F 11/3476 |
| 2025/0220571 A1 * | 7/2025 | Kumar | | H04W 24/02 |
| 2025/0233658 A1 * | 7/2025 | Calhoun, Ph.D | | H04B 10/40 |

FOREIGN PATENT DOCUMENTS

| | | | | | |
|---|---|---|---|---|---|
| CN | 110073301 A | * | 7/2019 | | G05B 23/0297 |
| CN | 209085657 U | * | 7/2019 | | G05B 23/0297 |
| CN | 113888132 A | * | 1/2022 | | G06F 16/2462 |
| CN | 114257599 A | * | 3/2022 | | H04L 67/1012 |
| CN | 116032362 A | * | 4/2023 | | H04B 17/15 |
| CN | 116113967 A | * | 5/2023 | | G06Q 50/184 |
| CN | 116483028 A | * | 7/2023 | | G05B 19/41875 |
| CN | 117978627 A | * | 5/2024 | | H04W 24/08 |
| CN | 119090855 A | * | 12/2024 | | G02B 5/1876 |
| CN | 119136229 A | * | 12/2024 | | H04W 4/14 |
| CN | 119136229 B | * | 1/2025 | | H04W 4/14 |
| CN | 119090855 B | * | 4/2025 | | G02B 5/1876 |
| CN | 120238928 A | * | 7/2025 | | H04B 17/318 |
| EP | 1524781 A1 | * | 4/2005 | | H04B 10/071 |
| EP | 4216120 A1 | * | 7/2023 | | G05B 19/41875 |
| EP | 4580145 A1 | * | 7/2025 | | H04B 17/318 |
| JP | H09512336 A | * | 12/1997 | | G01B 21/04 |
| JP | 2003115806 A | * | 4/2003 | | |
| JP | 2007228031 A | * | 9/2007 | | |
| JP | 2011035738 A | * | 2/2011 | | |
| JP | 2011087121 A | * | 4/2011 | | |
| JP | 5434461 B2 | * | 3/2014 | | |
| JP | 2023107223 A | * | 8/2023 | | G05B 19/41875 |
| KR | 20130101636 A | * | 9/2013 | | H04B 10/071 |
| KR | 20240160099 A | * | 11/2024 | | H04J 14/0293 |
| RU | 2765984 C2 | * | 2/2022 | | H05B 47/185 |
| WO | WO-02054654 A2 | * | 7/2002 | | G06F 11/008 |
| WO | WO-2005012949 A2 | * | 2/2005 | | H04B 10/40 |
| WO | WO-2014021075 A1 | * | 2/2014 | | H04J 14/00 |
| WO | WO-2023094913 A1 | * | 6/2023 | | G06F 3/017 |
| WO | WO-2023141496 A1 | * | 7/2023 | | H04J 14/0293 |
| WO | WO-2024042580 A1 | * | 2/2024 | | H04W 16/18 |
| WO | WO-2024115958 A1 | * | 6/2024 | | H04W 24/02 |
| WO | WO-2024192111 A1 | * | 9/2024 | | G06F 16/243 |
| WO | WO-2024233638 A1 | * | 11/2024 | | H04L 41/0631 |
| WO | WO-2025038598 A1 | * | 2/2025 | | G06F 11/3476 |

OTHER PUBLICATIONS

C. Mendoza, V. Dasari and M. P. McGarry, "Using SFP Data to Detect Contaminated Fiber Connectors," 2018 IEEE 10th Latin-American Conference on Communications (LATINCOM), Guadalajara, Mexico, 2018, pp. 1-6, (Year: 2018).*

F. P. Kapron, "Update on optical component reliability and testing requirements," OFC 2001. Optical Fiber Communication Conference and Exhibit. Technical Digest Postconference Edition (IEEE Cat. 01CH37171), Anaheim, CA, USA, 2001, pp. ThB2-ThB2, (Year: 2001).*

J. B. Schlager, M. J. Hackert, P. Pepeljugoski and J. Gwinn, "Measurements for enhanced bandwidth performance over 62.5-μm multimode fiber in short-wavelength local area networks," in Journal of Lightwave Technology, vol. 21, No. 5, pp. 1276-1285, May 2003, (Year: 2003).*

International Search Report and Written Opinion for International Application No. PCT/US2024/028325 mailed Jul. 26, 2024, 12 pp.

Notaro Paolo et al: "An Optical Transceiver Reliability Study based on SFP Monitoring and OS-level Metric Data", 2023 IEEE/ACM 23rd International Symposium on Cluster, Cloud and Internet Computing (CCGRID), IEEE, May 1, 2023 (May 1, 2023), pp. 1-12, XP034375201, DOI: 10.1109/CCGRID57682.2023.00011 [retrieved on Jul. 10, 2023].

(56)                    References Cited

OTHER PUBLICATIONS

International Search Report and Written Opinion in International
Application No. PCT/US2024/019712, mailed Jul. 8, 2024, 13 pp.
Selector: "Selector Analytics Architecture", Mar. 1, 2022 (Mar.
2022), pp. 1-8, XP093178363, Retrieved from the Internet: URL:https://
www.selector.ai/wp-content/uploads/2022/03/SelectorArchitecture-
Paper.pdf, 8 pp.

* cited by examiner

EARLY IDENTIFICATION OF OPTICAL TRANSCEIVER FAILURES

BACKGROUND

Description of the Related Art

Optical transceivers are fundamental components in modern communication networks, facilitating the transmission and reception of optical signals over fiber-optic cables. These transceivers play a critical role in ensuring reliable data transmission and reception within the network. However, like all electronic and optical devices, optical transceivers are subject to degradation, malfunctions, and failures over time due to various factors such as temperature variations, electrical stresses, manufacturing defects, and environmental conditions. The failure of optical transceivers can result in significant network downtime, data loss, and operational disruptions, leading to substantial financial losses and a negative impact on user experience. Therefore, there is a growing need to develop robust and proactive mechanisms for predicting and preventing optical transceiver failures.

Current approaches for addressing this challenge rely on reactive maintenance, where transceivers are either replaced after failure or malfunction. However, this approach can be costly, inefficient, and can lead to unexpected service disruptions. Alternatively, using Digital Optical Monitoring (DOM) metrics, available across various vendors, can allow for real-time or periodic measurement and reporting of critical optical and electrical parameters. However, individual nodes or devices in the optical network lack the capability to calculate optical quality metrics that necessitate information beyond what can be measured directly on each device, such as transmitted and received power for specific fibers or links. Further, monitoring systems may only be able to collect and visualize data without providing any insight into predictive identification of failures of optical links or fibers.

In view of the above, improved systems and methods to facilitate predictive failure identification and management of optical networks, especially optical transceivers, are needed.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for observation and management of optical transceivers are described. Specifically, the systems and methods described herein utilize cross analytics of transceiver telemetry (e.g., DOM metrics) with transceiver metadata (vendor, type, model, etc.). to identify sustained and significant changes in the metrics that persist over time. In one implementation, a percentage of change with respect of a previous value in the metric can be tracked over a configurable period of time. Anomalies are identified if such change persists over a minimum (also configurable) period of time. In another implementation, a reliability score is computed for all metrics, such that based on the score unreliable metrics can be excluded from the overall analysis to mitigate misleading results. Further, the metrics as well as transceiver metadata are correlated to perform an outlier detection. For example, optical transceivers of the same type (characterized by a combination of vendor, type and model) are analyzed for outlier detection. Furthermore, a variability factor is taken into account for metrics, as an indicator of a likely hardware condition that may be precursor of a failure.

In one implementation, an aggregated operational rating is computed which is an indicator of overall transceiver performance. The aggregated operational rating for a transceiver is computed based on captured anomalies for all metrics for the transceiver over a configurable period of time. Consequently, the aggregated operational rating aids network operators or other personnel in estimation of the probability for an interface to flap in a specific period of time. When these probabilities exceed a threshold, proactive maintenance around such transceivers is performed.

Figure 1:
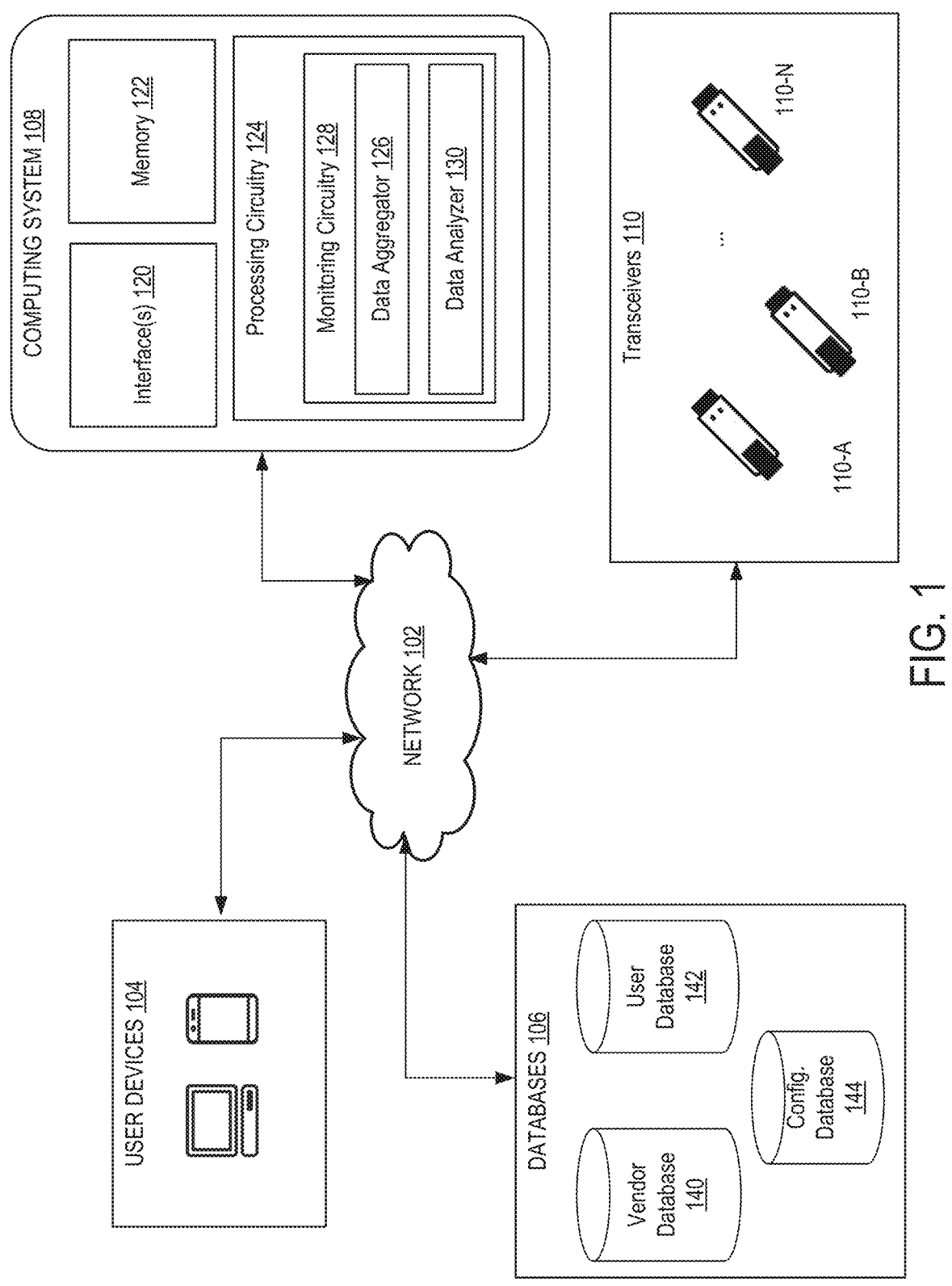
FIG. 1 illustrates a block diagram of an example network implementation of an operations monitoring system.

FIG. 1 illustrates an exemplary network implementation 100 for functioning of a computing system 108 (alternatively referred to as operations management system or OMS 108). In an implementation, the operations management system 108 is configured to manage operations and maintenance of one or more optical network devices, such as optical transceivers 110 (transceivers 110A-N), over a network 102. Optical transceivers 110 are configured to facilitate the transmission and reception of data over optical fibers. Their operation involves both transmitting and receiving optical signals, converting them between electrical and optical forms, and interfacing with other network devices. Optical transceivers 110 are typically installed in slots or ports of networking devices like switches, routers, or servers. They interface with the networking devices through specific connectors and protocols (e.g., SFP, SFP+, QSFP) ensuring compatibility and optimal data transfer rates.

Optical transceivers 110 often have built-in monitoring capabilities (e.g., Digital Optical Monitoring or DOM) to measure various parameters like optical power, temperature, voltage, and error rates. These parameters are crucial for real-time monitoring, troubleshooting, and ensuring the transceiver is operating within specified thresholds. However, DOM is limited to monitoring parameters that can be measured within the transceiver itself (e.g., power levels, temperature). DOM analysis is restricted to transceiver-generated parameters and cannot provide a complete view of the entire optical link or network. Further, different vendors may implement DOM differently, leading to compatibility and interoperability issues, making it difficult to use a standardized approach across a diverse range of optical transceivers 110.

To improve upon these limitations of DOM-based analytics of optical transceivers 110, the OMS 108 is configured to generate real-time analysis data, including failure prediction and early outlier detection for the optical transceivers 110. In one implementation, the OMS 108 is configured to compute an indicator for predicting future failures for the transceivers 110. The OMS 108 can aggregate anomalies captured for all metrics (e.g., provided by DOM and augmented with other transceiver metadata) for each optical transceiver 110. The resulting analysis data can be correlated with real-time inputs from the optical transceivers 110 and predict future failures, such as those defined by interface error rates or interface flap rates.

In an implementation, results of the above analysis can be provided to one or more user devices 104 over the network 102. In one example, the user devices 104 includes devices used by IT administrators, network engineers, and/or maintenance personnel to inspect performance of the optical transceivers 110, either on-site or remotely. User devices 104 can include personal computers, digital assistants, smartphones, tablets, and laptops, can be connected to the network 102 or operate independently. These devices may also have various external or internal components, like a mouse, keyboard, or display. User devices 104 can run a variety of applications, such as word processing, email, and internet browsing, and can be compatible with different operating systems like Windows or Linux.

The operations management system 108 is further connected to one or more databases 106, over the network 102, such that data generated, e.g., as a result of execution of instructions by the OMS 108, is stored in at least one of the databases 106. In one implementation, the databases 106 can be internal to the OMS 108. The databases 106 at least includes a vendor database 140, a user database 142, and a configuration database 144. The vendor database 140, in an implementation, stores data pertaining to operational data for the optical transceivers 110. In a non-limiting example this data can include, product specifications, performance data, compatibility and standards data, feature data, and the like. The configuration database 144, in one implementation, stores data pertaining to configuration data for the optical transceivers 110 such as ports and connectivity information, transmission parameters, fiber information, physical connection data, and the like. Lastly, user database 142 can include user data, such as but not limiting to, user settings, thresholds and alarms, firmware and software versions, security data, and the like, for various users and end-clients associated with the optical transceivers 110.

As shown in the figure, the OMS 108 includes one or more interface(s) 120, a memory 122, and at least one processing circuitry 124. In an implementation, the one or more interface(s) 120 are configured to display data generated as a result of the processing circuitry 124 executing one or more programming instructions stored in the memory 122. The processing circuitry 124 further includes monitoring circuitry 128 comprising data aggregator 126 and data analyzer 130. The data aggregator 126 is configured to ingest data associated with optical transceivers 110 (as detailed in FIG. 3). In an implementation, the ingested data is indicative of operational parameters of the optical transceivers 110 being monitored. The data, in an example, can include information pertaining to operating current and voltages, temperature data, transmission power data, etc. for each transceiver 110 being monitored. The data can further include metadata associated with the optical transceivers 110, such as device type, interface type, vendor ID, and the like. In an implementation, the data is heterogenous, in that, the content as well as the format of the data is nonconsistent. The data aggregator 126 is configured to ingest such heterogenous data from multiple data sources, such as, network management interface data, data services pipeline data, time-series data, and the like. The data can also include data from existing data logging and network monitoring systems. Different types of data ingested for analysis is further described in FIG. 3. The collected data is processed and correlated with different user devices 120 and the correlated data can be stored in the user database 142.

The data analyzer 130 analyzes data ingested by the data aggregator 130 and analyzes the collected data, e.g., to provide proactive information pertaining to operational failure and other anomalies associated with the optical transceivers 110. In an implementation, the data analyzer 130 cross analyses transceiver telemetry (or DOM metrics) with metadata associated with the optical transceivers 110 to detect sustained and significant changes in any operational parameters of the optical transceivers 110. In another implementation, the data analyzer 130 is configured to automatically identify whether the optical transceivers 110 present behavioral features that are substantially different from their peer transceivers, over a given period of time, to detect outliers and anomalies in the behavioral pattern of the optical transceivers 110. This analysis by the data analyzer 130 can help network operators estimate a probability for a transceiver failure in a specific period of time. When these probabilities reach a threshold limit, proactive maintenance around problematic transceivers can be performed. The analysis of data for proactive failure prediction of optical transceivers 110 is further explained in detail with reference to FIGS. 3-6.

In one implementation, the OMS 108 can be a standalone computing system. In another implementation, the OMS 108 can take form of a processing unit (e.g., memory 122) of a computing system comprising of a central processing unit and a system memory (e.g., memory 122). Such implementations are contemplated.

Figure 2:
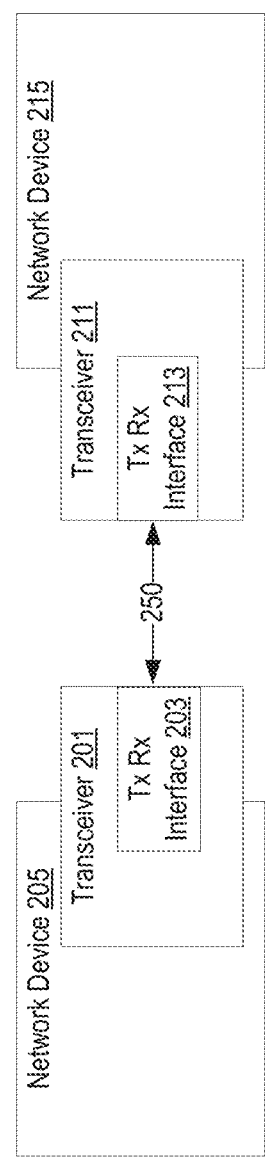
FIG. 2 illustrates a block diagram of an example implementation of various components of a network device.

FIG. 2 is a block diagram outlining a network environment demonstrating management of an optical network transceiver device. In this example, the network environment, comprises two optical network transceiver devices, labeled as 201 and 211, connected through an optical network link identified as 250. In certain instances, this optical network connection is implemented using a single-mode fiber cable. Each of the optical network transceiver devices, 201 and 211, is equipped with an optical Tx Rx interface for both transmitting and receiving optical signals. Specifically, optical network transceiver device 201 is equipped with optical Tx Rx interface 203, while optical network transceiver device 211 features optical Tx Rx interface 213. To establish the optical network connection denoted as 250, both optical network transceiver devices, 201 and 211, make use of their respective optical Tx Rx interfaces, denoted by 203 and 213, respectively.

In the illustrated implementation, optical network transceiver device 201 is installed within network device 205, while optical network transceiver device 211 is placed within network device 215. In different variations, network devices 205 and 215 may function as network switches. In various implementations, optical network transceiver devices 201 and 211 employ a Quad Small Form-factor Pluggable (QSFP) interface. In these implementations, the interface could be a QSFP+, QSFP28, or a different QSFP interface variant. In various scenarios, optical network transceiver devices 201 and 211 can serve as optical transceivers that make use of a QSFP, QSFP+, QSFP28, or a compatible interface. As an example, optical network transceiver devices 201 and 211 might be quad-channel optical transceiver devices with high-speed capabilities, where each channel supports one or more transmission rates.

As explained in greater detail below, optical network transceiver devices 201 and 211 perform the transmission and reception of optical signals. In different scenarios, to ensure a consistent power level for optical signals traveling through optical network connection 250, the current supplied to optical network transceiver devices 201 and 211 is regulated based on feedback obtained by monitoring the transmitted power output. For instance, if the power output from an optical network transceiver device decreases, the device's current is increased in response to stabilize the power output. In some cases, an increase in operating temperature for optical network transceiver devices 201 and 211 leads to a reduction in their respective transmitted power outputs, necessitating an increase in current to stabilize the power levels. Various implementations involve the optical network transceiver device monitoring power output for the purpose of current adjustment. For instance, in some cases, an optical network transceiver device may incorporate a power monitoring module to observe the transmitted power output.

In various implementations, optical monitoring logic is incorporated into the firmware of optical network transceiver devices 201 and 211. In some implementations, optical monitoring logic takes the form of a digital optical monitoring (DOM) chip (not shown). For instance, in some implementations, optical monitoring logic is realized through an optical monitoring integrated circuit. For example, the full-rate inter-integrated circuit (I2C) communication protocol can be employed to retrieve the power output of optical network transceiver device 201 and 211, via optical network connection 250. In various implementations, optical network transceiver devices 201 and 211 can contain electrically erasable programmable read-only memory (EEPROM) (not shown) that can be accessed through optical network connection 250. In some implementations, this EEPROM is used to store information related to optical network transceiver devices 201 and 211, which can include data like transmission power (e.g., power output), current, temperature, supplier details, version, serial number, and vendor information.

In various implementations, a given transceiver, such as transceiver 201, attempts to keep its power output relatively constant. For instance, when the optical transmission output signal decreases, the optical monitoring logic sends a signal to the transceiver to increase the current flow. This increase in current typically results in a corresponding increase in power output. In certain implementations, the transceiver also aims to maintain its power output within an operational range that spans from initial usage to the end of its service life. For example, this operational range may encompass roughly 6 dB for the transmission power output, with an initial level of approximately 0 decibel-milliwatts (dBm) and an end-of-life level of approximately −6 dBm. In response to a decrease in power output, such as going from 0 dBm to −3 dBm, the optical monitoring logic instructs the transceiver to increase the current.

In different implementations, operational characteristics such as current, power output, and temperature are continuously managed throughout the lifespan of an optical network transceiver device. This management can include measuring the values of these parameters, as well as tracking any variations and oscillations in these values. The assessment also involves quantifying the number, extent, and duration of these fluctuations. In various scenarios, these measurements depend on a configurable time interval, with the specific time interval chosen affecting the range of detectable fluctuations.

In one scenario, the data under surveillance serves the purpose of assessing the operational performance of the transceiver, using information gathered from other optical network transceivers that have encountered similar fluctuations. For instance, the transceiver's output signal is monitored to ascertain its validity at specific temperature levels. This validation process involves comparing the transceiver's temperature to a predefined threshold, such that if the temperature exceeds the threshold, the output signal is deemed invalid. Furthermore, the output signal may also be invalidated based on the number of fluctuations surpassing a predefined threshold. For instance, by analyzing the monitored data obtained from various optical network transceiver devices from the same vendor, the output signal of an optical network transceiver device with the same vendor and/or model may be declared invalid if it exhibits an excessive number of fluctuations.

In various implementations, the systems and methods described herein, achieve superior observation and management of optical transceivers that traditional digital optical monitoring (DOM) systems. Specifically, the systems and methods described herein utilize cross analytics of transceiver telemetry (e.g., DOM metrics) with transceiver metadata (vendor, type, model, etc.). Further, sustained and significant changes in any of the DOM metrics are detected, such that any changes to the metrics are analyzed using certain rules to capture changes that persist over a configurable period of time. In one implementation, a percentage of change with respect of a previous value in the metric can be tracked over a configurable period of time. Outliers can be detected if such change persists over a minimum (also configurable) period of time. In another implementation, a reliability score is computed for all metrics, such that based on the score unreliable metrics can be excluded from the overall analysis to mitigate misleading results. Further, the DOM metrics as well as the correlated metadata are leveraged to perform an outlier detection. In one example, optical transceivers of the same type (characterized by a combination of vendor, type and model) are analyzed for outlier detection. Furthermore, a variability factor is taken into account for DOM metrics, as an indicator of a likely hardware condition that may be precursor of a failure.

Ultimately, an aggregated operational rating is computed which is an indicator of overall transceiver performance. In one implementation, the aggregated operational rating for a transceiver is computed based on captured anomalies for all metrics for the transceiver over a configurable period of time. Consequently, the aggregated operational rating aids network operators or other personnel in estimation of the probability for an interface to flap in a specific period of time. When these probabilities exceed a threshold, proactive maintenance around such transceiver is performed. These and other implementations are explained with greater detail in the description that follows.

Figure 3:
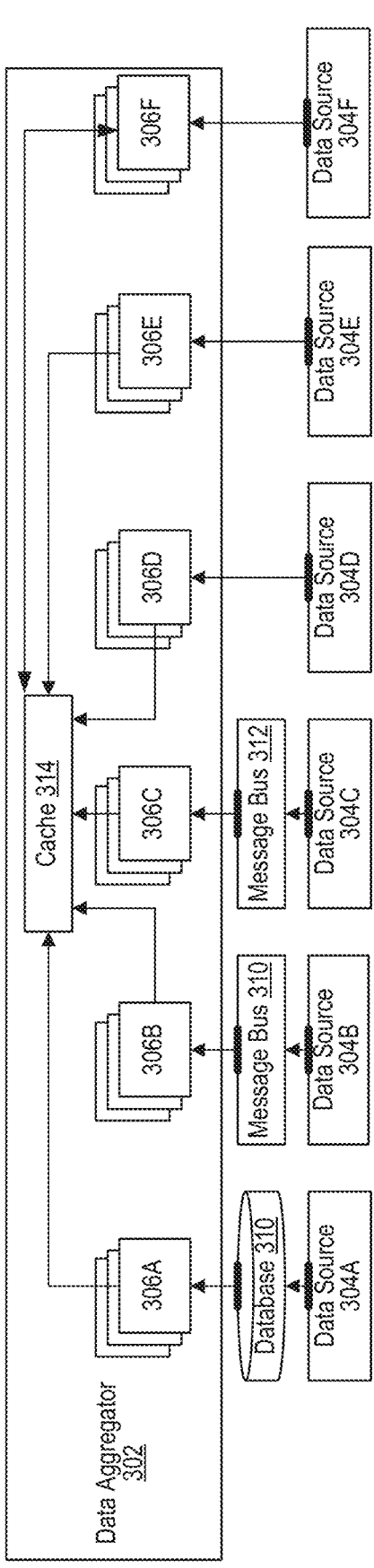
FIG. 3 illustrates a block diagram of an example procedure for performance data aggregation for optical transceivers.

Referring now to FIG. 3, a block diagram illustrating data ingested by a data aggregator unit of an operations management system (OMS). As described in the foregoing, a data aggregator unit, such as the data aggregator 302 of FIG. 3, is configured to ingest heterogenous data from multiple data sources, the data representative of operational information associated with multiple optical transceivers. In an implementation, the data sources can either be requested from third-party Digital Optical Monitoring (DOM) services and/or directly from the transceivers being monitored (e.g., transceivers having inbuilt DOM capabilities).

In the implementation shown in FIG. 3, the data aggregator 302 ingests data from a plurality of data sources, including data sources 304A-F (collectively referred to as data sources 304). In an implementation, each different data source 304 can contain data in different formats that may be generated as a result of operations executed by the or associated with the transceivers. Further, collection engines 306A-F may each be associated with a particular data source 304. In an implementation, data collection engines 306 include systems designed to gather, process, and store data from various data sources 304. The data collection engines 306 are configured to collect and store data from a single source, or can include complex systems that can handle data from multiple sources and perform advanced analytics on that data. In several implementations, data collection engines 306A-F can be implemented in a variety of ways, including through software programs, web applications, or specialized hardware systems (not shown). They may be used in combination with other tools, such as data visualization software or machine learning algorithms, to analyze and interpret the collected data.

The ingested data, in an implementation, can be varied in terms of source of data and type of data. Some non-limiting examples of ingested data are described as follows:

Data Source 304A—Transceiver Internal Sensors: Optical transceivers often have internal sensors to measure parameters like temperature, voltage, laser bias current, and transmitted optical power. These sensors provide real-time data for monitoring and control.

Data Source 304B—Optical Power Meters: External power meters can be connected to optical links to measure transmitted and received optical power levels, contributing to DOM data.

Data Source 304C—Optical Spectrum Analyzers: These devices can analyze the spectrum of the optical signal and provide information about the signal's wavelength, power, and noise characteristics.

Data Source 304D—Optical Network Management Software: Network management software can communicate with optical transceivers and collect DOM data through management protocols like SFF-8472, SFF-8636, or Digital Diagnostic Monitoring (DDM).

Data Source 304E—Monitoring and Test Equipment: Specialized test equipment, such as optical time-domain reflectometers (OTDRs) and optical performance monitors (OPMs), can be used to capture DOM data and assess the condition of optical links.

Data Source 304F—Optical Performance Monitoring (OPM) Systems: OPM systems are designed to monitor various aspects of optical performance, such as signal quality, dispersion, and signal-to-noise ratio, contributing to DOM data.

Other Data Sources—Other data sources in addition to the data sources described above can include DOM Hardware Interfaces, Network Management Systems, Transponder and Amplifier Equipment, Error Correction and FEC Data, and the like.

In various implementations, the received data from the data sources 304 include optical receive power (Rx power), optical transmit power (Tx power), laser bias current (LBC), Laser Temperature, Wavelength of the optical signal, Optical Signal-to-Noise Ratio (OSNR), bit error rate (BER), operating voltage, alarms, and warnings. Other types of data from various other data sources are contemplated.

In an implementation, each different type of data received from data sources 304 is ingested by the data aggregator 302 using a particular data collection engine 306, as shown. Further, the data may be ingested using a dedicated message bus, through a datastore associated with the data source, and/or directly through the data source without the use of auxiliary infrastructure. As shown in FIG. 3, data from data sources 304 may be collected in database 308 and retrieved from the collection engines 306 through the database 308. Further, messages buses, e.g., buses 310 and 312 can be configured between collection engines 306 and data sources 304. As described in the foregoing, each collection engine 306, in an implementation, can be cloud-native, such that scaling out of the collection engines 304 for new types of data may be possible. The collection engines 306 are configured to provide an entry point for ingestion of data into the OMS.

In an implementation, the data collected by each data collection engine 306 is stored in a cache memory 314 associated with the data aggregator 302. In an implementation, the cache 314 may include a fast access memory, such that data from the cache 314 can be frequently accessed from the main memory or storage (not shown) by other components of the OMS, such as data analyzer 316 and/or metrics generator 318. In one example, the cache 314 is typically located on a processor chip or on a separate memory module and operates at a higher speed than main memory or storage. Other storage locations for the data are contemplated.

Figure 4:
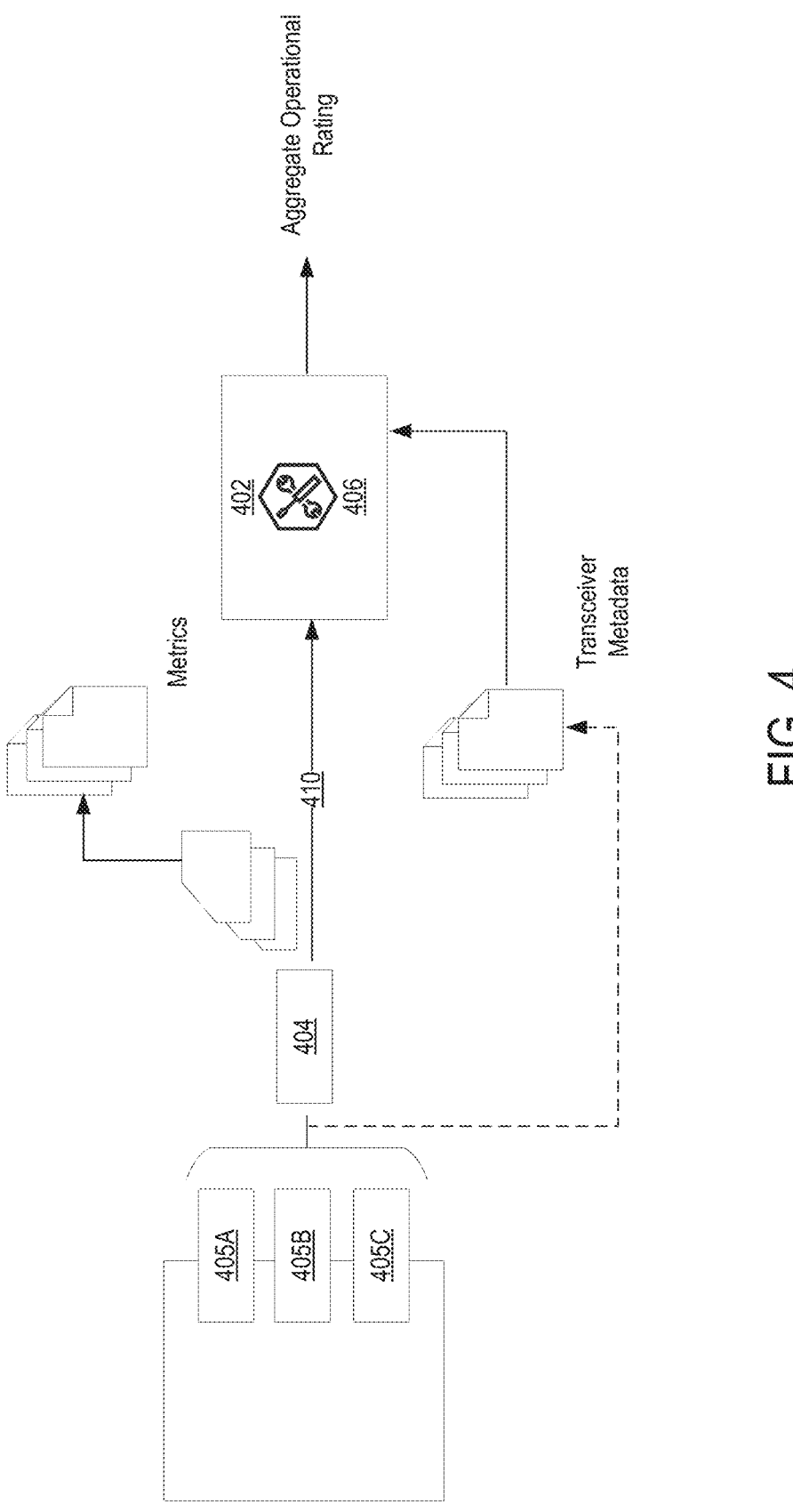
FIG. 4 illustrates a block diagram of an example procedure for analyzing optical transceiver operational parameters for identification of anomalies.

Turning now to FIG. 4, a block diagram showing workings of a data analyzer unit of an operations management system (OMS) is illustrated. It is noted that although the following description is focused on transceiver operational parameters, systems and methods described herein can be utilized to mine various other types of data, e.g., AIOps data. Such implementations are contemplated.

In an implementation, operational data associated with optical transceivers (405A-C) ingested by the OMS through the data aggregator (e.g., data aggregator 302 described in FIG. 3) is further processed by the data analyzer 402 to generate analysis data that provides actionable insights into the performance and overall 'health' of optical transceivers 405 under monitoring. As shown in FIG. 4, the data analyzer 402 accesses data 410 ingested by a data aggregator 404. In an implementation, since ingested data 410 is heterogenous, each different type of data may have its own characteristics, such as schema, format, encapsulation mechanisms, and the like. To this end, depending on the type of data (and data source from where the data is collected), the data analyzer 402 processes the ingested data to generate actionable insights.

In one implementation, the data analyzer 402 includes a monitoring toolkit 406, such that the data ingested by the data aggregator is exposed to the monitoring toolkit 406. In one example, the toolkit 406 is configured based on any open-source monitoring systems (e.g., Prometheus). The toolkit 406 can be configured to store and collect time-series data, e.g., various DOM metrics over a given period of time (or during predefined time intervals). In an implementation, this toolkit 406 can use a Simple Network Management Protocol (SNMP) to scrape metrics obtained from the transceivers 405 and expose these metrics in a predefined format for the toolkit 406 to utilize. For instance, data ingested by the data aggregator is formatted and normalized, such that the data can be utilized by the toolkit 406 for further analysis. In an implementation, the data analyzer 402 stores this data in a time-series database (not shown).

In one implementation, using the time-series data, the data analyzer 402 performs further analysis, e.g., to predictively determine failure of one or more transceivers 405 under analysis. According to the implementation, using the time-series data, the data analyzer 402 tracks each metric over a given period of time. For instance, the data analyzer 402 tracks operating parameters such as bias current, wavelength, operating voltage, temperature, etc. for each transceiver of a group of transceivers. In an implementation, the given period of time can be configured based on user-defined policies. In one example, a period of 30 days can be configured as a time period for tracking the operating parameters. In an implementation, the time period can be reconfigured responsive to one or more parameters such as transceiver age, installation location, change in operational settings, and the like.

In an implementation, using the tracked data, the data analyzer 402 computes a variability score for each metric of a given optical transceiver 405. The variability score is indicative of a variation in values of each metric over the given period of time. For instance, the data analyzer 402 can monitor data associated with each metric of a given transceiver 405, to identify how values of each metric vary over the given period of time. In one implementation, some values of the metric can be disregarded from the variability score calculation. For example, instances where a given metric of the transceiver 405 would skew the variability score can be identified and metric values during such instances can be ignored when computing the variability score. In one example, when scheduled maintenance of the transceiver 405 is performed, the transceiver 405 may be disconnected, and therefore for the period of time the schedule maintenance occurs, no data is received from the transceiver 405. In another example, during exceptional load situations like long-distance communication, very high data transmission rates, environmental factors, etc. metrics like Rx power and current can show abnormal increases, and can therefore skew the variability score results. In such cases, the data analyzer 402 can make a decision to ignore metric values for a set time period or interval of time, during when these conditions persist. The remaining values of the metrics are then utilized to generate the variability score.

In an implementation, the variability score is computed by the data analyzer 402 based on how the value of a given metric for the transceiver 405 fluctuates from a pre-computed value for the metric. In an example, the variability score is computed using a mean average of the metric's values over the time period. A deviation is then computed for each data point from the mean, e.g., by subtracting the mean from each data point. The calculated deviations are then squared, e.g., to give more weight to larger deviations. Finally, the variability score is computed by generating the average of the squared deviations. Other possible methods of computing the variability score are possible and are contemplated.

Based on the variability score, the data analyzer 402 further generates a reliability score for each metric. In an implementation, the reliability score is indicative of how reliable values of a metric are, such that using the score the metric can be selected or disregarded for further analysis. In one example, the reliability score is computed using Cronbach's alpha which ranges from 0 to 1, with higher values indicating greater reliability. The reliability score computed is based on the variability score, in that, if N is the total number of metrics, and S is the sum of variability scores of N individual metrics and V is the total of variability scores across all metrics, the reliability score can be given by:

$$\frac{N}{N-1} * [1 - \left(\frac{S}{V}\right)].$$

Other methods for computing reliability scores are possible and are contemplated.

In an implementation, the reliability score computed for each metric is compared to a set threshold to determine whether the given metric is reliable or unreliable. For example, if 0.7 is set as the threshold for reliability, any metric having a score of greater than or equal to 0.7 can be deemed as a reliable metric, while metrics having a score less than 0.7 are disregarded from the analysis.

In one implementation, traditionally, each transceiver 405 is expected to operate in a similar (or near-similar) manner, e.g., based on vendor-recommended operational parameters. That is, any time there is a deviation from the expected operational parameters for a transceiver, that transceiver is simply marked as malfunctioned equipment. The malfunctioned equipment is then replaced during a maintenance operation. However, in certain scenarios, the expected operational parameters for the transceiver may not be available. For instance, vendor recommended operational parameters for a transceiver are either not provided by the vendor or are otherwise inaccessible. Further, even when vendor recommended parameters are available, analyzing the transceivers using these parameters may only provide warnings and alerts when a fault event has already happened, thereby not allowing for proactive maintenance.

In order to provide better accuracy in predicting the operational behavior of transceivers, the data analyzer 402 is configured to analyze the metrics provided by the transceivers and correlate this analysis with metadata associated with the transceiver 405. In one implementation, this correlation is utilized to classify similar transceivers in a group, e.g., based on device type or vendor type. That is, before the metrics are analyzed, the data analyzer 402 is configured to classify transceivers 405 from a given set of transceivers as being of the same group. A selected metric for a given transceiver 405 from the classified group of transceiver is analyzed in correlation with other transceivers in the same group.

In one implementation, for any given transceiver 405 under monitoring, the data analyzer 402 is configured to select one or more metrics for analysis (e.g., based on respective reliability scores for the metrics). The data analyzer 402 then monitors the changes or fluctuations in value of the metric over a given period of time (e.g., based on the variability scores). In one example, the fluctuations are measured as a percentage of change in the metric value, with respect to a previous value of the metric tracked over a configurable period of time. In an implementation, the data analyzer 402 monitors the metric for the transceiver 405 at least for a minimum period of time, before the analysis can produce an analysis result. That is, the data analyzer 402 monitors data associated with the transceiver 405 for a minimum period of time (e.g., 24 hours) or a predefined number of operational cycles, such that adequate amount of data is collected to perform an accurate analysis.

In an implementation, to analyze any given metric, the data analyzer 402 firstly determines whether the given metric is reliable. As described above, the data analyzer 402 computes reliability score for each possible metric to be analyzed (e.g., bias current, voltage, power, etc.). Based on this reliability score, the data analyzer 402 selects or disregards a given metric for the analysis. Once a metric is selected, the values of the selected metric, e.g., collected over a minimum period of time, are analyzed to check whether these values have changed over the period of time in comparison to values of the same metric for other transceivers, as well as with respect to values of the metric previously tracked over a given period of time.

For example, the data analyzer 402 correlates the values of the metric for a selected transceiver 405 with metadata associated with the selected transceiver 405, in order to determine other transceivers that are similar to the selected transceiver 405. Based on identification of similar transceivers, the metric associated with the selected transceiver is compared with the same metric of other similar transceivers, to identify deviation in the values of the metric. In one implementation, the transceiver metadata can include device type, interface type, device vendor, transceiver type, and the like.

In one implementation, the comparison is performed using z-scores for the metric for each transceiver 405. For instance, the data analyzer 402 computes the z-score for the metric for each transceiver to measure how many standard deviations away the value of the metric is from the mean (average) of all the values of the metric. In an implementation, based on the z-score, the data analyzer 402 can identify if the metric is different from the values of the same metric for other transceivers. For example, when bias temperature is selected as the metric under analysis, for transceivers of the same type (i.e., group of transceivers classified based on metadata), the standard score of the bias temperature can be 25 degree Celsius. If a given transceiver's bias temperature is constantly in the range of 35 to 45 degree Celsius for the given time period, the transceiver is flagged and further analysis on the transceiver is conducted.

In an implementation, when vendor recommended operational parameters are available, the data analyzer 402 is configured to cross analyze the actual metric values with the recommended values. Referring again to the above example, in a scenario where the vendor recommended values for bias current is between 20 to 50 degree Celsius for a given group of classified transceivers, this is included in the analysis of the transceiver, e.g., to ensure that the transceiver 405 is not erroneously flagged. In such situations, further analysis is performed including the vendor recommended parameters as an analysis factor. In an implementation, when the vendor recommended operational parameters are unavailable, the described analysis can also be utilized to generate a range of recommended operational parameters for the transceivers.

If the transceiver 405 is flagged, the data analyzer 402 further conducts an analysis to identify whether the value of the metric has varied substantially over the period of time, with respect to the values of the same metric for other transceivers. In one implementation, the variation in values of the metric is determined based on the variability score computed for the metric. For example, referring to the example of bias temperature, for a 7-hour period, if the temperature ranges from 35 to 45 degree Celsius, the variance for the bias temperature metric is calculated as 10.86 $C^2$ (Degree Celsius squared). Further, the measure of variability in the original temperature units, based on the square root of the variance, is calculated to be 3.30° C. The data analyzer 402 can determine, based on the variability score, whether the fluctuations in bias temperature for the given period of time is greater than or equal to a predefined threshold. For example, if the threshold is defined as ±1.5° C. based on metric values from other transceivers, the data analyzer 402 flags the transceiver for predicted failure (since the variance is greater than 2 times the allowed threshold).

In one implementation, a predictor for fault prediction is generated by the data analyzer 402 based on the described analysis. In one example, the predictor includes an aggregate operational rating for each transceiver 405. The aggregate operational rating, in one example, is indicative of an overall 'health' of the transceiver. The aggregate operational rating can be a numeric value, e.g., ranging from 1-10, wherein 1 is the lowest rating and 10 is the highest rating. In another example, the aggregate operational rating can also be a percentage value, i.e., 0 to 100 percent. In various implementations, the generated predictors aid in determining a probable timeline of failure for a transceiver (e.g., a percentage probability of transceiver failure as well as approximate time this probability will be reached). Further, the predictors can also be used to predict a percentage of error rate as well as a percentage of interface flap rate for the transceiver 405 under analysis. In an implementation, the probability or percentage of these errors can be determined using methodologies such as Bayes Theorem. Other implementations are contemplated.

In an implementation, the thresholds for various parameters such as reliability scores, variability scores, aggregate operational ratings, etc. used in the analysis of the transceivers can be updated dynamically, based on one or more additional factors. In one example, these thresholds can be updated based on an 'age' of the transceiver under analysis. For instance, if a given transceiver has been in operation longer than an average cumulative operation period of other transceivers, the thresholds for the parameters can be relaxed for that transceiver during analysis. In another implementation, the thresholds can further be updated based on a geographic location where the transceiver has been installed. For instance, bias temperature thresholds for transceivers installed in location having hotter temperatures (e.g., desert locations) can be set differently to transceivers installed in colder locations (e.g., Serbia). Other additional factors are possible and are contemplated. In various implementations, updating thresholds dynamically based on additional factors, such as transceiver age and installation locations, can result in mitigation of accidental flagging of unfaulty transceivers.

In an implementation, based on the analysis and the resulting aggregate operational rating, the data analyzer 402 is configured to identify outliers in transceiver data indicating potential anomalies that require attention. In one example, such outliers can be identified in operational parameters such as bias current, voltage, transmit and receive power values, and the like. Based on the identification of the outliers in various parameters, the data analyzer 402 is configured to mark respective transceivers for proactive maintenance and/or replacement. In one implementation, to generate analysis results with greater accuracy, the data analyzer 402 is further configured to correlate the aggregate operational rating of the transceiver 405 with real-time inputs received from the transceiver. For example, a transceiver has been previously flagged for maintenance or replacement, can be marked as unfaulty based on correlation of real-time inputs from the optical transceiver 405 with the result of the analysis. Further, in response to such a change in the operational performance of the transceiver 405, the data analyzer 402 can reanalyze the transceiver parameters, e.g., to update any parameter thresholds that had previously resulted in an inaccurate analysis. This way, the system can periodically train itself and update thresholds using real-time inputs, and the predictions can get more accurate over time.

In various implementations, using historical transceiver data, i.e., metric data collected over a given period of time, the data analyzer 402 can accurately identify which of the group of transceivers have already failed, as well as determine an exact time at which the transceivers have failed. Based on this determination, the data analyzer 402 can train a model to predict when a selected transceiver is likely to fail. For example, the data analyzer 402 can capture data associated with one or more events leading up to potential transceiver failures and use this data to predict a likelihood of failure for the selected transceiver. That is, by comparing historical metric data of similar transceivers, with real time metric values of the selected transceiver, the data analyzer 402 can identify and predict whether the selected transceiver is likely to fail. The data analyzer 402 can further predict an approximate time at which the transceiver is likely to fail (or begin malfunctioning). In one implementation, based on such identification, the data analyzer 402 can train a machine learning model to predict these events.

In other implementations, using real time metric values, the data analyzer 402 is configured to identify transceiver(s) deviating from vendor recommended operational parameters. Further, the data analyzer 402 can also identify transceivers that are operating in a manner that deviates from that of other transceivers of the same type (e.g., manufactured by the same vendor or of the same device type). In an implementation, the data analyzer 402 can use the identified deviations as an indicator to identify transceivers that are more likely to fail. These optical transceivers can be flagged for maintenance. In one or more implementations, the historical metric data and the real-time metric data can also be correlated for providing a more accurate analysis.

For optical transceivers flagged for maintenance, the data analyzer 402 can also similarly analyze other transceivers (e.g., transceivers classified in the same group and/or transceivers installed in the same geographical location), to identify other transceivers that may need to be flagged for maintenance as well. In an implementation, the analysis described in the foregoing allow the OMS to identify transceivers that are malfunctioning, before the transceivers fail, thereby allowing for proactive maintenance. Further, this also allows for planning replacement activities for the transceivers that can leverage other maintenance operations, and therefore specific maintenance scheduled solely for transceivers can be avoided.

In an implementation, the analysis of the transceivers, as described herein, can further allow identification of transceiver vendors and types that have a greater affinity to failures and malfunctions than other transceivers. Transceivers associated with such vendors and transceiver types can be minimized. Additionally, such identification can also result in organizations installing these transceivers to better negotiate with vendors. In one implementation, the data analyzer 402 can produce specific ratings for each vendor, e.g., based on vendors and transceiver types with highest interface failure rate and/or highest deviation in metrics over a given period of time. Other implementations are contemplated.

Figure 5:
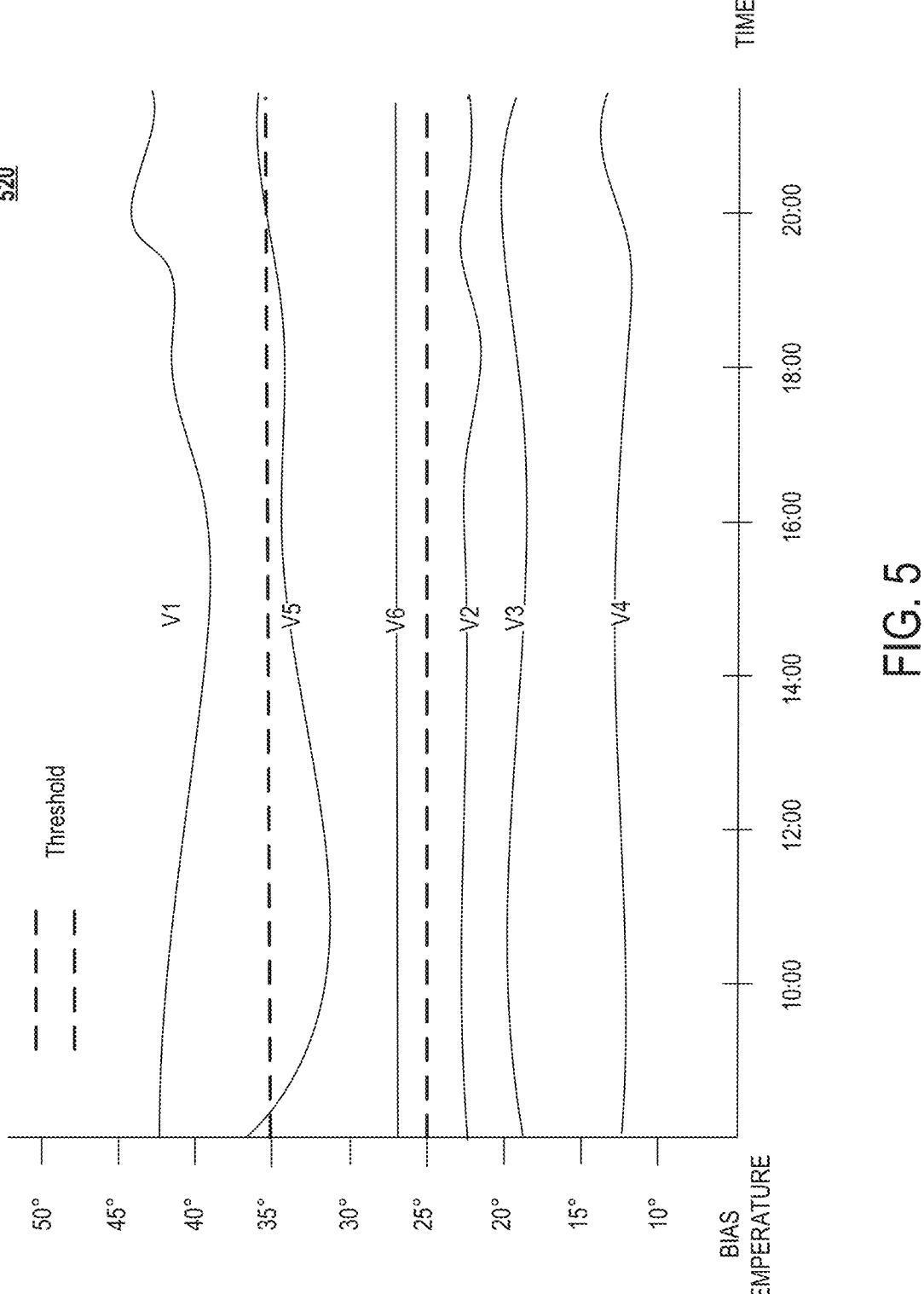
FIG. 5 illustrates graphical representation of a transceiver metric analysis for outlier detection.

FIG. 5 illustrates graphical representation of a transceiver metric analysis for outlier detection. FIG. 5 depicts a graph 520 of bias current values received from a set of transceivers, each manufactured by a different vendor. The graph 520 depicts changes in the value of bias currents (given in degree Celsius) for each transceiver (manufactured by vendors V1, V2 . . . V6), as compared to a predefined threshold. As shown in the figure, by correlating transceiver metadata (i.e., vendor identifier) with actual values of the bias currents, outliers can be identified.

As shown, the threshold is set between a range of 25-degree to 35-degree Celsius. In one implementation, the thresholds can be dynamically updated based on one or more factors, such as age of the transceivers, location of the transceivers, exceptionally high network load, and the like. In another implementation, a variance threshold may be associated with the bias current threshold, e.g., ±2.5-degree Celsius, indicating that a value of bias current for any transceiver, that is within a range of 2.5 degrees (positive or negative) from the preset threshold, is deemed as working adequately. All other transceivers outside this range may be deemed as faulty.

In the example shown by graph 520, bias current values for transceivers manufactured by vendors V5, V6, and V2 are all within the permissible range of bias current range. Further, transceiver manufactured by vendor V1 has a bias current higher than the threshold range, while transceivers manufactured by vendors V3 and V4 have a bias current lower than the threshold range. In an implementation, these transceivers can be flagged for predicted failure. Based on the flagging of these transceivers, a monitoring system can either perform further analysis (as described in FIG. 4) or transmit an alert to one or more personnel devices to schedule maintenance or replacement for these transceivers. In various implementations, other metric values, such as Rx and Tx power, voltage, and other metrics can be similarly analyzed. Further, each such analysis can be correlated with specific metadata, such as transceiver type, interface type, transceiver vendor, location, and the like.

Figure 6:
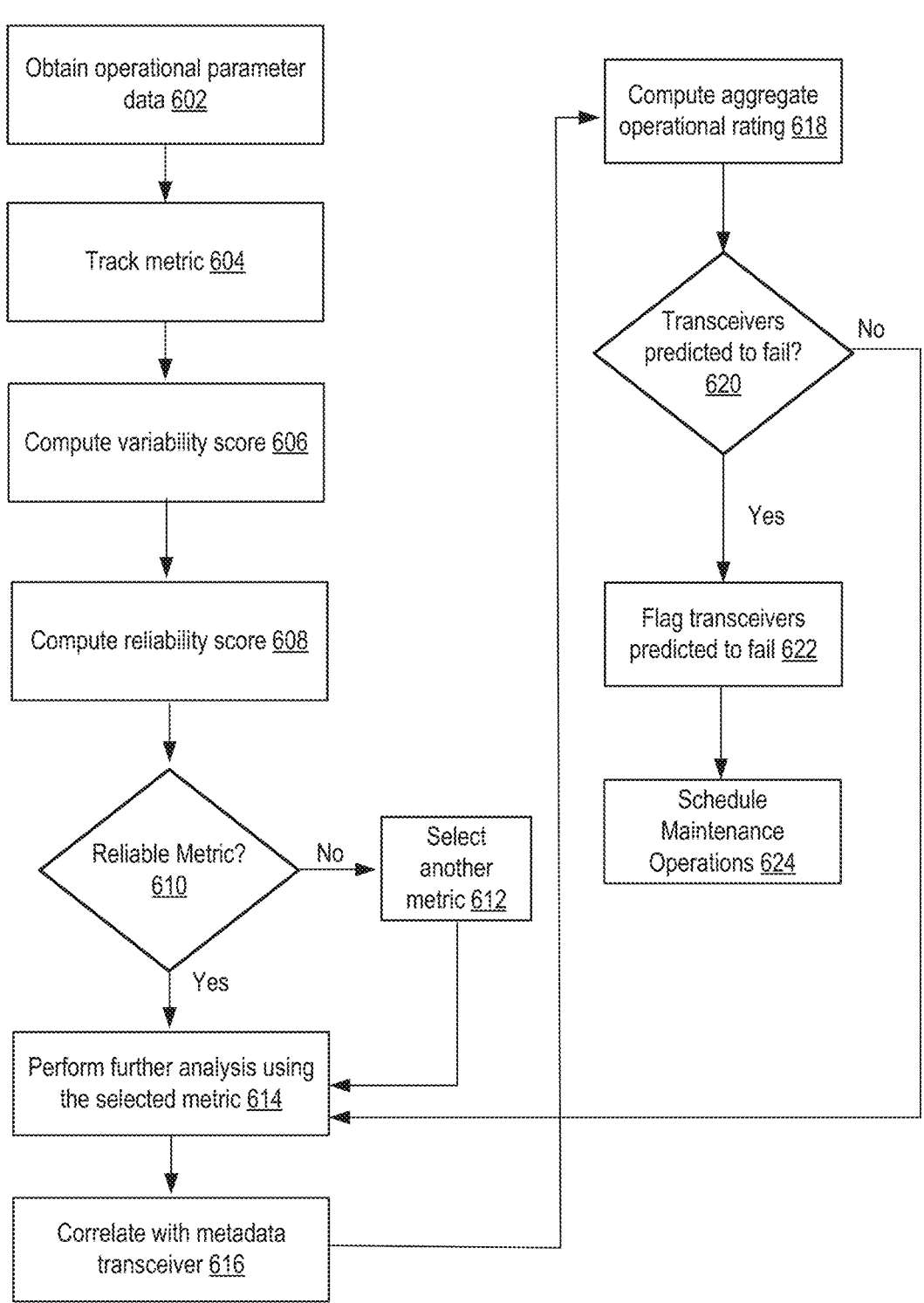
FIG. 6 illustrates a method for predicting faulty operations of transceivers.

FIG. 6 illustrates a method for predicting faulty operations of transceivers. As described in the foregoing, an operations management system (OMS) receives operational parameter data from the transceivers or from third-party monitoring systems (block 602).

In an implementation, the OMS is configured to track each operational parameter (or 'metric') over a specified period of time (block 604). In an implementation, the period of time is defined based on user-defined policies as described in the foregoing.

In one implementation, the OMS further computes a variability score for each metric (block 606). In one example, the variability score is computed based on how the value of a given metric for a transceiver fluctuates from a pre-computed value for the metric. In an example, the variability score is computed using a mean average of the metric's values over the time period. A deviation is then computed for each data point from the mean, e.g., by subtracting the mean from each data point. The calculated deviations are then squared, e.g., to give more weight to larger deviations. Other possible methodologies to compute the variability score are contemplated.

Based on the variability score, the OMS is further configured to compute a reliability score for each metric (block 608). In one implementation, the reliability score is computed to determine which metrics can be included for conducting further analysis on the transceiver, and which metrics need to be disregarded. In one example, the reliability score is computed using Cronbach's alpha which ranges from 0 to 1, with higher values indicating greater reliability. Further, the reliability score computed for each metric is compared to a set threshold to determine whether the given metric is reliable or unreliable. For example, if 0.7 is set as the threshold for reliability, any metric having a score of greater than or equal to 0.7 can be deemed as a reliable metric, while metrics having a score less than 0.7 are disregarded from the analysis.

Based on the reliability score, the OMS is configured to determine whether a given metric is reliable or unreliable (conditional block 610). In one implementation, the reliable metrics are selected for further analysis. In case the metric is unreliable (conditional block 610, "no" leg), the OMS is configured to select another metric for analysis (block 612). However, if the metric is reliable (conditional block 610, "yes" leg), the OMS is configured to perform further analysis using the metric (block 614). As described in the foregoing, the analysis includes identifying fluctuations in metric values based on metric variability score. In one implementation, the analysis further includes cross analyzing the metric values with vendor recommended values of the metric, when vendor recommended operational parameters are available.

In an implementation, based on the analysis of the transceiver, the result of the analysis is correlated with transceiver metadata (block 616). In one example, the correlation is done to determine how the metric values for the transceiver are deviating from the same metric values of other transceivers grouped together based on the transceiver metadata. The deviation can be determined with respect to predefined threshold associated with the selected metric. In one implementation, using historical transceiver data, i.e., metric data collected over a given period of time, the OMS accurately identifies which of the group of transceivers have already failed, as well as determine an exact time at which the transceivers have failed. Based on this determination, the data analyzer 402 can train a model to predict when a selected transceiver is likely to fail (e.g., by correlating the transceiver metadata with historically collected metric data). The OMS can further predict an approximate time at which the transceiver is likely to fail (or begin malfunctioning). In one implementation, based on such identification, the OMS can train a machine learning model to predict these events.

In one implementation, the OMS is configured to generate an aggregate operational rating for each transceiver that is predicted to fail (block 618). The aggregate operational rating, in one example, is indicative of an overall 'health' of the transceiver. The aggregate operational rating aids in determining a probable timeline of failure for the transceivers (e.g., a percentage probability of transceiver failure as well as approximate time this probability will be reached). Further, this rating can also be used to predict a percentage of error rate as well as a percentage of interface flap rate for the transceiver.

In an implementation, based on the real time metric values for the selected metric as well as the aggregate ratings of transceivers, the OMS can identify transceiver(s) deviating from vendor recommended operational parameters. The OMS can identify transceivers that are operating in a manner that deviates from that of other transceivers of the same type (again based on correlating transceivers based on transceiver metadata). The OMS can use the identified deviations as an indicator to identify transceivers that are more likely to fail.

If no transceivers are precited for failure (conditional block 620, "no" leg), the OMS is configured to continue analyzing the transceiver based on collected data for the selected metric (block 614). However, if such transceiver(s) are identified (conditional block 620, "yes" leg), the OMS is configured to flag such transceivers for maintenance or replacement (block 622).

Based on the flagging of transceiver(s), the OMS can schedule maintenance operation for the transceiver(s) (block 624). In an implementation, this can include sending notifications and alerts to maintenance personnel devices, including device indicator, timeline of likelihood of failure or malfunctioning of the transceiver(s), and data related to other similar transceivers installed in the same locality. The personnel can perform maintenance operations on faulty transceiver(s) or replace the faulty transceiver(s) onsite. Further, other transceivers installed in the vicinity can also be checked for their performance, thereby avoiding multiple maintenance cycles.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising monitoring circuitry configured to:
   compare a value of a selected metric associated with a device of a plurality of devices, with respective values of the selected metric recorded for other devices from the plurality of devices;
   determine, based at least in part on a result of the comparison correlated with metadata associated with the device, whether an operational performance of the device is deviating from other devices of the plurality of devices; and
   flag the device for a predicted failure, responsive to the operational performance of the device deviating from other devices of the plurality of devices for a given period of time.

2. The system as claimed in claim 1, wherein the monitoring circuitry is configured to:
   compute, for each metric of a plurality of metrics, a variability score for the device indicative of a variation in values of the selected metric over the given period of time;
   compute, based at least in part on the variability score, a reliability score for the selected metric; and
   disregard the selected metric for the comparison, responsive to the reliability score for the selected metric being less than a predetermined threshold.

3. The system as claimed in claim 1, wherein the metadata at least comprises device type, interface type, vendor information, installation location, or a combination thereof.

4. The system as claimed in claim 1, wherein the monitoring circuitry is configured to calculate, based at least in part on metadata associated with the device, a range of recommended operational values for the selected metric.

5. The system as claimed in claim 4, wherein the monitoring circuitry is configured to flag the device for a predicted failure, responsive to the operational value of the selected metric being outside the range of recommended operational values.

6. The system as claimed in claim 1, wherein the monitoring circuitry is configured to correlate the selected metric for the device with one or more real-time inputs received from the device, to generate an aggregate operational rating for the device.

7. The system as claimed in claim 6, wherein the monitoring circuitry is configured to schedule, for one or more devices including the flagged device, at least one maintenance operation based at least in part on respective aggregate operational ratings of the one or more devices.

8. A method comprising:

comparing, by a monitoring circuitry, a value of a selected metric associated with a device of a plurality of devices, with respective values of the selected metric recorded for other devices from the plurality of devices;

determining, by the monitoring circuitry, based at least in part on a result of the comparison correlated with metadata associated with the device, whether an operational performance of the device is deviating from other devices of the plurality of devices; and flagging, by the monitoring circuitry, the device for a predicted failure, responsive to the operational performance of the device deviating from other devices of the plurality of devices for a given period of time.

9. The method as claimed in claim 8, further comprising:

computing, by the monitoring circuitry for each metric of a plurality of metrics, a variability score for the device indicative of a variation in values of the selected metric over the given period of time;

computing, by the monitoring circuitry based at least in part on the variability score, a reliability score for the selected metric; and disregarding, by the monitoring circuitry, the selected metric for the comparison, responsive to the reliability score for the selected metric being less than a predetermined threshold.

10. The method as claimed in claim 8, wherein the metadata at least comprises device type, interface type, vendor information, installation location, or a combination thereof.

11. The method as claimed in claim 8, further comprising calculating, by the monitoring circuitry based at least in part on metadata associated with the device, a range of recommended operational values for the selected metric.

12. The method as claimed in claim 11, further comprising flagging, by the monitoring circuitry, the device for a predicted failure, responsive to the operational value of the selected metric being outside the range of recommended operational values.

13. The method as claimed in claim 8, further comprising correlating the selected metric for the device with one or more real-time inputs received from the device, to generate an aggregate operational rating for the device.

14. The method as claimed in claim 13, further comprising scheduling, by the monitoring circuitry, for one or more devices including the flagged device, at least one maintenance operation based at least in part on respective aggregate operational ratings of the one or more devices.

15. A non-transitory computer-readable medium storing instructions that, when executed by one or more processors of an operations management system, cause the system to:

compare a value of a selected metric associated with a device of a plurality of devices, with respective values of the selected metric recorded for other devices from the plurality of devices;

determine, based at least in part on a result of the comparison correlated with metadata associated with the device, whether an operational performance of the device is deviating from other devices of the plurality of devices; and flag the device for a predicted failure, responsive to the operational performance of the device deviating from other devices of the plurality of devices for a given period of time.

16. The non-transitory computer-readable medium as claimed in claim 15, wherein the instructions are further executable to cause the system to:

compute, for each metric of a plurality of metrics, a variability score for the device indicative of a variation in values of the selected metric over the given period of time;

compute, based at least in part on the variability score, a reliability score for the selected metric; and disregard the selected metric for the comparison, responsive to the reliability score for the selected metric being less than a predetermined threshold.

17. The non-transitory computer-readable medium as claimed in claim 15, wherein the metadata comprises at least one of a device type, interface type, vendor information, or installation location.

18. The non-transitory computer-readable medium as claimed in claim 15, wherein the instructions are further executable to cause the system to calculate, based at least in part on metadata associated with the device, a range of recommended operational values for the selected metric.

19. The non-transitory computer-readable medium as claimed in claim 15, wherein the instructions are further executable to cause the system to correlate the selected metric for the device with one or more real-time inputs received from the device, to generate an aggregate operational rating for the device.

20. The non-transitory computer-readable medium as claimed in claim 19, wherein the instructions are further executable to cause the system to schedule, for one or more devices including the flagged device, at least one maintenance operation based at least in part on respective aggregate operational ratings of the one or more devices.

* * * * *